(12) United States Patent
Hiraiwa

(10) Patent No.: US 10,214,058 B2
(45) Date of Patent: *Feb. 26, 2019

(54) RUN FLAT TIRE

(71) Applicant: TOYO TIRE & RUBBER CO., LTD., Osaka-shi, Osaka (JP)

(72) Inventor: Akie Hiraiwa, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 200 days.

This patent is subject to a terminal disclaimer.

(21) Appl. No.: 14/669,561

(22) Filed: Mar. 26, 2015

(65) Prior Publication Data

US 2015/0306921 A1    Oct. 29, 2015

(30) Foreign Application Priority Data

Apr. 24, 2014    (JP) .................. 2014-090478

(51) Int. Cl.
*B60C 1/00*    (2006.01)
*B60C 17/00*    (2006.01)

(52) U.S. Cl.
CPC ............ *B60C 17/0009* (2013.01); *B60C 1/00* (2013.01); *B60C 2001/0033* (2013.01); *B60C 2017/0063* (2013.01)

(58) Field of Classification Search
CPC ........ B60C 1/00; B60C 17/00; B60C 17/0009
See application file for complete search history.

(56) References Cited

U.S. PATENT DOCUMENTS

| 5,131,445 | A | 7/1992 | Tokieda et al. |
| 5,253,691 | A * | 10/1993 | Scriver ................ B60C 1/00 152/537 |
| 5,464,899 | A | 11/1995 | Freeman et al. |
| 5,859,101 | A | 1/1999 | Kikkawa et al. |
| 6,196,289 | B1 | 3/2001 | Yoshioka |
| 6,494,242 | B2 | 12/2002 | Cottrell |
| 7,900,667 | B2 * | 3/2011 | Vasseur ............ B60C 1/0016 152/209.1 |
| 2006/0219343 | A1 | 10/2006 | Hochi |
| 2008/0295941 | A1 | 12/2008 | Shiraishi |
| 2009/0095394 | A1 | 4/2009 | Kameda |

(Continued)

FOREIGN PATENT DOCUMENTS

| CN | 101407603 A | 4/2009 |
| CN | 101484311 A | 7/2009 |

(Continued)

OTHER PUBLICATIONS

Machine translation of JP 2012-251017, 2012.*

(Continued)

*Primary Examiner* — Justin R Fischer
(74) *Attorney, Agent, or Firm* — Westerman, Hattori, Daniels & Adrian, LLP

(57) ABSTRACT

A run flat tire having a side wall part reinforced by a side reinforcing rubber part is disclosed. The side reinforcing rubber part is formed from a rubber composition having a ratio (M50H/M50N) of tensile stress (M50H) in 50% elongation at a measurement temperature of 100° C. to tensile stress (M50N) in 50% elongation at a measurement temperature of 23° C. of from 1.0 to 1.3.

11 Claims, 1 Drawing Sheet

(56) References Cited

U.S. PATENT DOCUMENTS

| | | |
|---|---|---|
| 2010/0112365 A1 | 5/2010 | Obrecht et al. |
| 2011/0172339 A1 | 7/2011 | Satou |
| 2011/0290396 A1 | 12/2011 | Nakagawa et al. |
| 2012/0152425 A1 | 6/2012 | Kawashima et al. |
| 2013/0037193 A1 | 2/2013 | Horiuchi |
| 2013/0158163 A1 | 6/2013 | Yagi et al. |
| 2014/0034206 A1 | 2/2014 | Mizuno |
| 2015/0306921 A1 | 10/2015 | Hiraiwa |

FOREIGN PATENT DOCUMENTS

| | | | |
|---|---|---|---|
| CN | 102264552 A | | 11/2011 |
| CN | 103124765 A | | 5/2013 |
| CN | 103374151 A | | 10/2013 |
| DE | 202011110368 U1 | | 8/2013 |
| EP | 2604651 | | 6/2013 |
| JP | S58-122946 A | | 7/1983 |
| JP | H03-176213 A | | 7/1991 |
| JP | 4-185512 A | | 7/1992 |
| JP | 2001-80319 A | | 3/2001 |
| JP | 2004-276699 A | | 10/2004 |
| JP | 2007-70373 A | | 3/2007 |
| JP | 2007-331422 A | | 12/2007 |
| JP | 2008-189911 A | | 8/2008 |
| JP | 2010-132168 A | | 6/2010 |
| JP | 2010-149632 A | | 7/2010 |
| JP | 2010-285514 A | | 12/2010 |
| JP | 2011-89031 A | | 5/2011 |
| JP | 2011-190410 A | | 9/2011 |
| JP | 2012-251017 | * | 12/2012 |
| JP | 2012-251017 A | | 12/2012 |
| JP | 2013-23651 A | | 2/2013 |
| JP | 2013-216753 A | | 10/2013 |
| JP | 2013-221052 A | | 10/2013 |
| JP | 2013-224054 A | | 10/2013 |
| JP | 2014-31400 A | | 2/2014 |
| WO | 2010/074286 A1 | | 7/2010 |

OTHER PUBLICATIONS

Office Action dated Jun. 29, 2016, issued in counterpart Chinese Patent Application 201510159519.9, with abridged English translation. (10 pages).
Office Action dated Jul. 18, 2017, issued in Japanese Patent Application No. 2014-090478, with English machine tanslation. (9 pages).
Final Office Action dated Jun. 26, 2017, issued in U.S. Appl. No. 14/702,904. (15 pages).
Final Office Action dated Jul. 18, 2017, issued in U.S. Appl. No. 14/721,442. (13 pages).
Notice of Allowance dated Aug. 2, 2017, issued in U.S. Appl. No. 14/813,525. (13 pages).
Notice of Allowance dated Jul. 14, 2017, issued in U.S. Appl. No. 14/750,265. (19 pages).
Office Action dated Nov. 22, 2016, issued in Chinese Application No. 201510419572.8, with machine tranlsation. (10 pages).
Office Action dated Sep. 30, 2016, issued in Chinese Application No. 201510289327.X, with English translation. (10 pages).
Non-Final Office Action dated Mar. 3, 2017, issued in U.S. Appl. No. 14/702,904 (6 pages).
Non-Final Office Action dated Mar. 3, 2017, issued in U.S. Appl. No. 14/721,442 (6 pages).
Non-Final Office Action dated Mar. 13, 2017, issued in U.S. Appl. No. 14/750,265 (8 pages).
Non-Final Office Action dated Apr. 6, 2017, issued in U.S. Appl. No. 14/813,525 (8 pages).
Final Office Action dated Sep. 28, 2016, issued in U.S. Appl. No. 14/813,525 (10 pages).
Non-Final Office Action dated Apr. 8, 2016, issued in U.S. Appl. No. 14/813,525 (10 pages).
Office Action dated Aug. 8, 2017, issued in Chinese Patent Application 201510419572.8, with machine translation. (12 pages).
Notice of Allowance dated Oct. 4, 2017, issued in U.S. Appl. No. 14/702,904 (11 pages).
Office Action dated Dec. 26, 2017, issued in counterpart Japanese Application No. 2014-158030, with English translation (11 pages).
Non-Final Office Action dated Oct. 26, 2017, issued in U.S. Appl. No. 14/721,442 (14 pages).
Notice of Allowance dated Dec. 15, 2017, issued in U.S. Appl. No. 14/721,442 (14 pages).
Office Action dated Dec. 21, 2017, issued in counterpart German Application No. 102015207453.6, with English translation. (8 pages).
Office Action dated Dec. 22, 2017, issued in German Application No. 102015214540.9, which is counterpart to related U.S. Appl. No. 14/813,525, with English translation. (9 pages).

* cited by examiner

RUN FLAT TIRE

CROSS-REFERENCE TO RELATED APPLICATIONS

This application is based upon and claims the benefit of priority from the prior Japanese Patent Application No. 2014-90478, filed on Apr. 24, 2014; the entire contents of which are incorporated herein by reference.

BACKGROUND

1. Technical Field

The present invention relates to a run flat tire.

2. Related Art

There is a pneumatic tire called a run flat tire that can run in a certain extent of distance even in the state that air pressure in a tire has reduced and reached 0 kPa by tire failure such as puncture. It is known to reinforce a side wall part by providing a side reinforcing rubber part on an inner surface of the side wall part as a technique for enabling run flat running in the state that an inner pressure has reduced as above.

High hardness compounded rubber composition is frequently used in a side reinforcing rubber part to suppress deformation of a tire during run flat running (for example, JP-A-2007-070373 and JP-A-2010-149632). However, a temperature of a side reinforcing rubber part is increased during run flat running, and as a result, rigidity of the side reinforcing rubber part is decreased, resulting in decrease of run flat durability.

JP-A-2008-189911 discloses that a rubber composition having a phenol type thermosetting resin and a methylene donor added thereto is used in a side reinforcing rubber part of a run flat tire. However, this literature does not disclose that rigidity of a rubber that is generally decreased at high temperature is set to rigidity equal to or more than that at ordinary temperature in order to improve run flat durability. Furthermore, this literature does not disclose that a quinoline type age resister is used together with the phenol type thermosetting resin and the methylene donor.

JP-A-2011-190410 discloses that in the technology of adding zinc oxide and aluminum nitride to a rubber composition for a run flat tire, a quinoline type age resister is added as an age resister. However, this literature does not disclose that rigidity of a rubber at high temperature is set to rigidity equal to or more than that at ordinary temperature in order to improve run flat durability. Furthermore, this literature does not disclose that a phenol type thermosetting resin and a methylene donor are used together with the quinoline type age resister.

SUMMARY

An object of the invention is to provide a run flat tire that can improve run flat durability.

The run flat tire according to the present embodiment has a side wall part reinforced by a side reinforcing rubber part, and the side reinforcing rubber part is formed from a rubber composition in which a ratio (M50H/M50N) of tensile stress (M50H) in 50% elongation at a measurement temperature of 100° C. to tensile stress (M50N) in 50% elongation at a measurement temperature of 23° C. is from 1.0 to 1.3.

According to the present embodiment, the side reinforcing rubber part is constituted using a rubber composition in which tensile stress at high temperature is equal to or more than tensile stress at ordinary temperature. This embodiment can suppress deformation of the side reinforcing rubber part having high temperature during run flat running and improve run flat durability, while maintaining running performance in normal running

DETAILED DESCRIPTION

Figure 1:
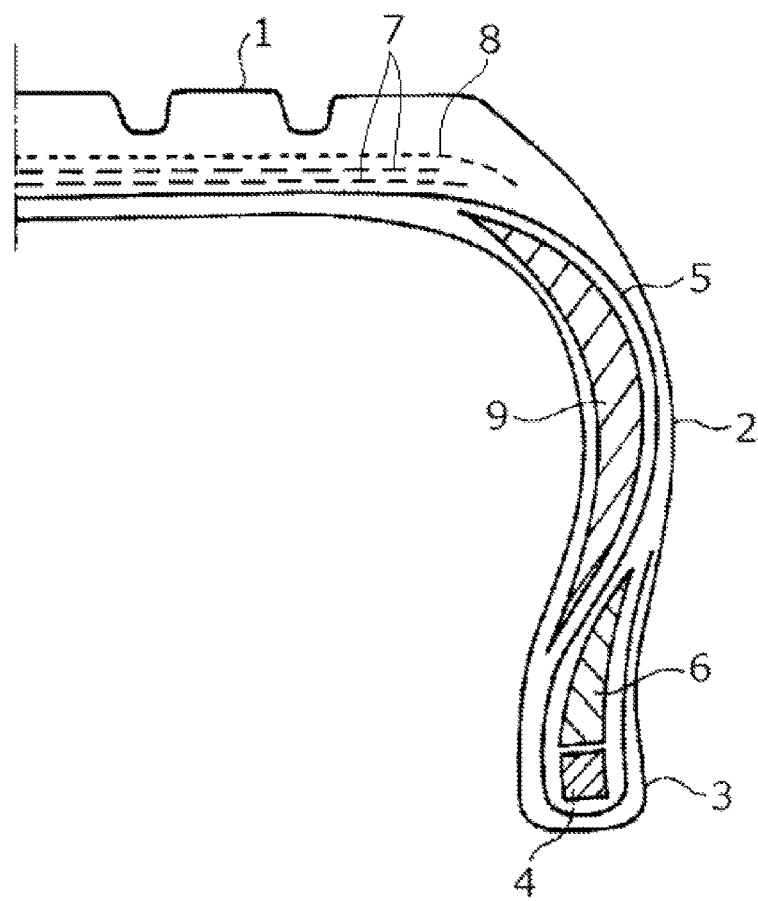
FIG. 1 is a half cross-sectional view of a pneumatic tire according to one embodiment.

Run flat tire according to the present embodiment has a side reinforcing rubber part in its side wall part, and the side reinforcing rubber part is formed using a rubber composition having novel properties that improve run flat durability.

The rubber composition is that when tensile stress in 50% elongation at a measurement temperature of 23° C. is M50N and tensile stress in 50% elongation at a measurement temperature of 100° C. is M50H, M50H/M50N that is a ratio of those satisfies the following relationship. That is, the rubber composition forming the side reinforcing rubber part is that properties of a vulcanized rubber satisfy the following relationship.

$$1.0 \le M50H/M50N \le 1.3$$

When the rubber composition having the above properties is used, the side reinforcing rubber part having the same properties is obtained, deformation of a side wall part during run flat running is suppressed while maintaining running performance during normal running, and run flat durability can be improved.

In detail, modulus of elasticity is decreased at high temperature in a high hardness compounded rubber composition generally used in a side reinforcing rubber part of a run flat tire. Inverting this relationship, a rubber composition in which tensile stress at high temperature (100° C.) corresponding to a temperature during run flat running is the same or more than tensile stress at ordinary temperature (23° C.) corresponding to a temperature during normal running is used in the present embodiment. When M50H/M50N is 1.0 or more, decrease of rigidity during run flat running is suppressed, and run flat durability can be improved. More preferably, tensile stress at high temperature is higher than tensile stress at ordinary temperature, that is, M50H/M50N>1.0, and still more preferably, M50H/M50N is 1.1 or more. On the other hand, where M50H/M50N is too large, rigidity at high temperature becomes too high, and run flat durability is rather deteriorated. Therefore, M50H/M50N is preferably less than 1.3, and more preferably 1.2 or less.

When the rubber composition has the tensile stress (M50H) in 50% elongation at 100° C. (M50H) of 3.5 MPa or more, it is preferred in that rigidity of a side wall part at high temperature is increased, thereby improving run flat durability. The lower limit of M50H is more preferably 4.0 MPa or more. The upper limit of M50H is not particularly limited, but is preferably 5.5 MPa or less, and more preferably 5.3 MPa or less. Setting M50H to the above upper limit suppresses the phenomenon that the rigidity at high temperature is too high and a side wall part becomes difficult to warp. As a result, run flat durability can be improved.

Tensile stress in 50% elongation at 23° C. (M50N) of the rubber composition is not particularly limited. However, to maintain running performance during normal running in good state, the tensile stress is preferably from 3.0 to 5.0

MPa. More preferably, the lower limit is 3.5 MPa or more, and the upper limit is 4.5 MPa or less.

The rubber composition having the above properties is not particularly limited, but a rubber composition having the following formulation is preferably used. That is, a rubber composition according to one embodiment comprises a diene rubber containing natural rubber and polybutadiene rubber, a phenol type thermosetting resin and a methylene donor as its hardener, and a mass ratio of the amount of the phenol type thermosetting resin to the amount of the methylene donor is 1.5 times or more.

In the rubber composition, the diene rubber as a rubber component contains natural rubber (NR) and polybutadiene rubber (BR). The natural rubber and polybutadiene rubber are not particularly limited and rubbers generally used in rubber industries can be used as the natural rubber and polybutadiene rubber. Ratio of those rubbers contained in the rubber component is not particularly limited, and for example, the content of the natural rubber may be from 20 to 70 mass %, and may be from 30 to 60 mass %. The content of the polybutadiene rubber may be from 30 to 80 mass %, and may be from 40 to 70 mass %. Tear resistance can be improved by increasing the content of natural rubber, and bending fatigue resistance can be improved by increasing the content of polybutadiene rubber.

Polybutadiene rubber having cis-1,4 bond content of 96% or more, for example, may be used as the polybutadiene rubber. When such polybutadiene rubber having high cis content is used, low heat generation performance can be improved, and run flat durability can be improved. The polybutadiene rubber having high cis content is preferably a rubber synthesized using a rare earth element type catalyst such as a neodymium type catalyst. As a microstructure of the butadiene rubber synthesized using a neodymium type catalyst, it is preferred that a cis-1,4 bond content is 96% or more, and a vinyl group (1,2-vinyl bond) content is 1.0% or less. The cis-1,4 bond content and vinyl group content used herein are values calculated by integrated ratio of $^1$HNMR spectrum.

The rubber component may be constituted of only natural rubber and polybutadiene rubber, and may contain other diene rubber. The other diene rubber is not particularly limited, and examples thereof include styrene-butadiene rubber (SBR), acrylonitrile-butadiene rubber (NBR) and chloroprene rubber (CR).

Examples of the phenol type thermosetting resin used include thermosetting resins obtained by condensation of at least one phenol compound selected from the group consisting of phenol, resorcin and those alkyl derivatives with aldehyde such as formaldehyde, and use of the resin can help to increase hardness. The alkyl derivatives include derivatives by relatively long-chain alkyl group, such as nonyl phenol or octyl phenol, in addition to methyl group derivatives such as cresol or xylenol. Specific examples of the phenol type thermosetting resin include various novolac type phenol resins such as an unmodified phenol resin obtained by condensation of phenol and formaldehyde (straight phenol resin), an alkyl-substituted phenol resin obtained by condensation of an alkyl phenol such as cresol, xylenol or octyl phenol and formaldehyde, a resorcin-formaldehyde resin obtained by condensation of resorcin and formaldehyde, and a resorcin-alkyl phenol copolycondensated formaldehyde resin obtained by condensation of resorcin, alkyl phenol and formaldehyde. Furthermore, for example, an oil-modified novolac type phenol resin obtained by modification with at least one oil selected from the group consisting of a cashew nutshell oil, a tall oil, a rosin oil, a linoleic acid oil, oleic acid and linolenic acid can be used. Those phenol type thermosetting reins may be used in any one kind alone and may be used as mixtures of two or more kinds.

Hexamethylenetetramine and/or melamine derivative are used as the methylene donor contained as a hardener of the phenol type thermosetting resin. The melamine derive includes at least one selected from the group consisting of hexamethoxymethylmelamine, hexamethylolmelamine pentamethyl ether and polyhydric methylolmelamine. Of those, hexamethoxymethylmelamine and/or hexamethylenetetramine are preferred as the methylene donor, and hexamethoxymethylmelamine is more preferred.

The amount (A) of the phenol type thermosetting resin added is A/B≥1.5 in terms of a mass ratio to the amount (B) of the methylene donor added. Where the proportion of the methylene donor as a hardener is too large, the proportion may adversely affect crosslinking system of a rubber. When those are used in appropriate amounts, M50H/M50N ratio is easily set to the above range, the effect of suppressing deformation of a tire during run flat running is increased, and run flat durability can be improved. A/B is more preferably 2.0 or more, and still more preferably 2.5 or more. The upper limit of A/B is preferably 5.0 or less, and more preferably 4.0 or less.

The amount of the phenol type thermosetting resin added is not particularly limited, but is preferably from 1 to 20 parts by mass, and more preferably from 1 to 10 parts by mass, per 100 parts by mass of the diene rubber. The amount of the melamine donor added is not particularly limited, but is preferably from 0.2 to 10 parts by mass, and more preferably from 0.5 to 5 parts by mass, per 100 parts by mass of the diene rubber.

It is preferred that the rubber composition according to the embodiment contains a quinoline type age resister and at least one age resister other than the quinoline type age resister. When two or more kinds of those age resisters are added, run flat durability can be improved.

The quinoline type age resister includes at least one selected from the group consisting of a 2,2,4-trimethyl-1,2-dihydroquinoline polymer (TMDQ) and 6-ethoxy-2,2,4-trimethyl-1,2-dihydroquinoline (ETMDQ).

Other age resister used together with the quinoline type age resister includes at least one age resister selected from the group consisting of an aromatic secondary amine type age resister, a phenol type age resister, a sulfur type age resister and a phosphite ester type age resister.

Examples of the aromatic secondary amine type age resister include p-phenylenediamine type age resisters such as N-phenyl-N'-(1,3-dimethylbutyl)-p-phenylenediamine (6PPD), N-isopropyl-N'-phenyl-p-phenylenediamine (IPPD), N,N'-diphenyl-p-phenylenediamine (DPPD), N,N'-di-2-naphthyl-p-phenylenediamine (DNPD), N-(3-methacryloyloxy-2-hydroxypropyl)-N'-phenyl-p-phenylenediamine or N-cyclohexyl-N'-phenyl-p-phenylenediamine; diphenylamine type age resisters such as p-(p-toluene sulfonylamide)diphenylamine, 4,4'-bis(α,α-dimethylbenzyl)dipheylamine (CD), octylated diphenylamine (ODPA) or styrenated diphenylamine; and naphthylamine type age registers such as N-phenyl-1-naphthylamine (PAN) or N-phenyl-2-naphthylamine (PBN). Those can be used in one kind alone or as mixtures of two or more kinds.

Examples of the phenol type age resisters include monophenol type age resisters such as 2,6-di-tert-butyl-4-methylphenol (DTBMP) or styrenated phenol (SP); bisphenol type age resisters such as 2,2'-methylene-bis(4-methyl-6-tert-butylphenol) (MBMBP), 2,2'-methylene-bis(4-ethyl-6- tert-butylphenol) (MBETB), 4,4'-butylidene-bis(3-methyl-6-tert-butylphenol) (BBMTBP) or 4,4'-thio-bis(3-methyl-6-tert-butylphenol) (TBMTBP); and hydroquinone type age resisters such as 2,5-di-tert-butylhydroquinone (DBHQ) or 2,5-di-tert-amylhydroquinone (DAHQ). Those can be used in one kind alone or as mixtures of two or more kinds.

Examples of the sulfur type age resister include benzimidazole type age resisters such as 2-mercaptobenzimidazole, 2-mercaptomethylbenzimidazole or a zinc salt of 2-mercaptobenzimidazole; dithiocarbamate type age resisters such as nickel dibutyldithiocarbamate; thiourea type age resisters such as 1,3-bis(dimethylaminopropyl)-2-thiourea or tributylthiourea; and organic thioacid type age resisters such as dilauryl thiodipropionate. The phosphite ester type age resister includes tris(nonylphenyl)phosphite. Those can be used in one kind alone or as mixtures of two or more kinds.

Of the above, the aromatic secondary amine type age resister is preferred as the other age resister used together with the quinoline type age resister, and p-phenylenediamine type age resister is more preferred.

The amount of the quinoline type age resister added is preferably 20 mass % or more based on the total amount of the age resisters, and improvement effect of run flat durability can be increased. The amount is more preferably 25 mass % or more, and still more preferably 30 mass % or more. The upper limit of the amount is preferably 80 mass % or less, and more preferably 75 mass % or less. The total amount of the age resisters added, that is, the total of the amount of the quinoline type age resister and the amount of the other age resister, is preferably from 1 to 10 parts by mass, more preferably from 1.5 to 7 parts by mass, and still more preferably from 2 to 5 parts by mass, per 100 parts by mass of the diene rubber. The amount of the quinoline type age resister added is preferably from 0.2 to 8 parts by mass, and more preferably from 0.5 to 4 parts by mass, per 100 parts by mass of the diene rubber.

The rubber composition according to the embodiment can contain a filler such as carbon black and/or silica. The amount of the filler added is preferably from 20 to 100 parts by mass, more preferably from 30 to 80 parts by mass, and still more preferably from 50 to 70 parts by mass, per 100 parts by mass of the diene rubber. The filler is preferably carbon black alone or a blend of carbon black and silica, and more preferably carbon black. The value of tensile stress of the rubber composition can be controlled by the kind and amount of the filler added.

Carbon black is not particularly limited, and carbon blacks ISAF Grade (N200s), HAF Grade (N300s), FEF Grade (N500s) and GPF Grade (N600s) (all is ASTM Grade) can be used. Carbon black FEF Grade is more preferred.

The rubber composition according to the embodiment can contain various additives generally used in a rubber composition for a tire, such as an oil, zinc flower, stearic acid, a wax, a vulcanizing agent and a vulcanization accelerator, other than the components described above. The vulcanization agent includes a sulfur component such as powdered sulfur, precipitated sulfur, colloidal sulfur, insoluble sulfur and highly dispersible sulfur. Although not particularly limited, the amount of the vulcanizing agent added is preferably from 0.1 to 10 parts by mass, more preferably from 0.5 to 8 parts by mass, and still more preferably from 1 to 5 parts by mass, per 100 parts by mass of the diene rubber. The amount of the vulcanization accelerator added is preferably from 0.1 to 7 parts by mass, and more preferably from 0.5 to 5 parts by mass, per 100 parts by mass of the diene rubber. Where the amount of the oil added is large, tensile stress at high temperature (100° C.) is decreased, and M50H/M50N ratio tends to be decreased. Therefore, the smaller amount is preferred. Although not particularly limited, for example, it is preferred that the oil is added in an amount of 5 parts by mass or less per 100 parts by mass of the diene rubber. That is, it is preferred that the rubber composition does not contain an oil or the content of an oil is 5 parts by mass or less per 100 parts by mass of the diene rubber.

The rubber composition can be prepared by kneading necessary components according to the conventional method using a mixing machine such as Banbury mixer, kneader or rolls, generally used.

The rubber composition according to the embodiment as described above contains the phenol type thermosetting resin and the methylene donor in the mass ratio described above, and further contains at least two kinds of age resistors including a quinoline type age resister. This embodiment increases tensile stress at high temperature, making it easy to set the M50H/M50N ratio to the above-described range, and can remarkably improve run flat durability.

The run flat tire according to the embodiment uses the rubber composition in its side reinforcing rubber part. FIG. 1 is a schematic half cross-sectional view showing one example of the run flat tire. The tire comprises a tread part 1, a pair (right and left) of side wall parts 2 extending inside in a radial direction from both ends of the tread part 1, and a pair (right and left) of bead parts 3 provided on the inside ends of the side wall parts 2. Bead cores 4 are embedded in a pair of the bead parts 3. Carcass ply 5 is embedded such that the both ends are locked by a pair of the bead cores 4. The carcass ply 5 is folded outside from the inside in a tire axial direction around the bead cores 4. Bead fillers 6 made of hard rubber, having a triangular cross-section are provided on the periphery in a radial direction of the bead cores 4 between a main boy of the carcass ply 5 and the folded part. Belt 7 is embedded outside in a radial direction of the carcass ply 5 in the tread part 1, and a belt reinforcing layer 8 is provided on the periphery of the belt 7. Side reinforcing rubber part 9 also called a side pad is provided on the side wall part 2 to increase its rigidity. The side reinforcing rubber part 9 is arranged on a tire inner surface side of the carcass ply 5 in the side wall part 2, and is provided in a crescent cross-sectional shape in a tire meridian cross-section.

In the present embodiment, the side reinforcing rubber part 9 is formed by the rubber composition of the above-described embodiment, and a run flat tire is obtained by, for example, vulcanization molding at a temperature of from 140 to 180° C. according to the conventional method. That is, an unvulcanized tire is prepared using an unvulcanized rubber composition described above in the side reinforcing rubber part, the unvulcanized tire obtained is vulcanization molded, and thereby, a run flat tire of the present embodiment is obtained. The run flat tire obtained has the side reinforcing rubber part 9 comprising the rubber composition of the above-described embodiment. Therefore, deformation of the side reinforcing rubber part 9 during run flat running is suppressed while maintaining running performance (such as running performance to run over a rut) in normal running, and run flat durability can be improved.

EXAMPLES

The invention is described in detail by reference to the following examples, but it should be understood that the invention is not construed as being limited to those examples.

Components excluding sulfur, a vulcanization accelerator and a methylene donor were mixed according to the formulation (parts by mass) shown in Table 1 below using Banbury mixer in a first step (nonproductive mixing step) (discharge temperature: 160° C.). Sulfur, a vulcanization accelerator and a methylene donor were then mixed with the thus-obtained mixture in a second step (final mixing step) (discharge temperature: 100° C.). Thus, a rubber composition for a side reinforcing rubber part was prepared.

Details of each component in Table 1 are as follows.
NR: Natural rubber, RSS #3
BR: "BR01" (cis-1,4 bond content: 95%) manufactured by JSR Corporation
Nd-BR: Polybutadiene rubber polymerized with a neodymium type catalyst, "BR40" (cis-1,4 bond content: 98%) manufactured by KUNHO PETROCHEMICAL
Oil: "JOMO PROCESS NC140" manufactured by JX Nippon Oil & Sun-Energy Corporation
Carbon black: N550, "SEAST SO" manufacture by Tokai Carbon Co., Ltd.
Stearic acid: "LUNAC S-20" manufactured by Kao Corporation Phenol type resin: Oil-modified novolac phenol resin, "SUMILITE RESIN PR13349" manufactured by Sumitomo Bakelite Co., Ltd.
Zinc flower: "Zinc Flower Grade 1" manufactured by Mitsui Mining & Smelting Co., Ltd.
Age resister 1: N-phenyl-N'-(1,3-dimethylbutyl)p-phenylenediamine, "ANTIGEN 6C" manufactured by Sumitomo Chemical Co., Ltd.
Age resister 2: 2,2,4-Trimethyl-1,2-dihydroquinoline polymer (TMDQ), "ANTAGE RD" manufactured by Kawaguchi Chemical Industry Co., Ltd.
Vulcanization accelerator: Sulfenamide type, "NOCCELER NS-P" manufactured by Ouchi Shinko Chemical Industrial Co., Ltd.
Methylene donor: Hexamethoxymethylmelamine, "CYREZ 964RPC" manufactured by Mitsui Cytech Ltd.
Sulfur: "MU-CRON OT-20" manufactured by Shikoku Chemicals Corporation Using a test piece having a thickness of 2 mm vulcanized at 160° C. for 25 minutes of each rubber composition, tensile stress in 50% elongation at 23° C. (M50N) and tensile stress in 50% elongation at 100° C. (M50H) were measured, and a ratio of those (M50H/M50N) was obtained. Passenger car radial tire (run flat tire) having a tire size of 225/45ZR18 was produced by the conventional method using each rubber composition in a side reinforcing rubber part, and run flat durability and running performance to run over a rut were evaluated. Each measurement and evaluation method is as follow.

M50N: According to JIS K6251, a test piece of dumbbell shape No. 3 was subjected to a tensile test at a room temperature of 23° C., and tensile stress in 50% elongation was obtained.

M50H: According to JIS K6251, a test piece (dumbbell shape No. 3) was maintained in a thermostat bath of 100° C. for 1 hour or more, a tensile test was then conducted in an atmosphere of 100° C. by a tensile tester equipped with a thermostat bath, and tensile stress in 50% elongation was obtained.

Run flat durability: Drum tester with a diameter of 1,700 mm having a smooth surface made of iron was used. Tire inner pressure was 0 kPa, and load was 65% of loading capacity corresponding to load index. Speed was increased to 80 km/h in 5 minutes from test start, and a tire was run on the drum tester until tire failure occurs in a speed of 80 km/h. Running distance until the failure occurs was indicated by an index relative to the value of Comparative Example 1 which is taken as 100. Larger index means that the run flat durability is excellent.

Figure 2:
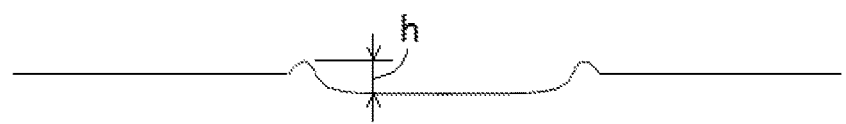
FIG. 2 is a cross-sectional view of a test road used in evaluation of running performance to run over a rut.

Running performance to run over a rut: Test tires were mounted on front wheels of a test vehicle, and running performance of tires to run over a rut was functionally evaluated on a test road (height difference of rut: 20 mm) having a cross-sectional shape shown in FIG. 2 that simulates a rut of general road. Tire that smoothly runs over a rut was defined as A, a tire that is slightly difficult to run over a rut was defined as B, and a tire that is difficult to run over a rut was defined as C.

The results obtained are shown in Table 1 below.

TABLE 1

| Formulation (parts by mass) | Comparative Example 1 | Comparative Example 2 | Comparative Example 3 | Comparative Example 4 | Example 1 | Example 2 | Example 3 | Example 4 | Example 5 | Example 6 | Example 7 |
|---|---|---|---|---|---|---|---|---|---|---|---|
| NR | 40 | 40 | 40 | 40 | 40 | 40 | 40 | 40 | 40 | 40 | 30 |
| BR | 60 | 60 | 60 | 60 | 60 | 60 | | 60 | 60 | 60 | 70 |
| Nd-BR | | | | | | | 60 | | | | |
| Oil | | | 10 | | | | | | | 3 | |
| Carbon black | 60 | 72 | 60 | 65 | 60 | 60 | 60 | 60 | 65 | 60 | 60 |
| Stearic acid | 2 | 2 | 2 | 2 | 2 | 2 | 2 | 2 | 2 | 2 | 2 |
| Phenol type resin | | 7 | 3 | 3 | 3 | 7 | 3 | 3 | 3 | 3 | 3 |
| Zinc flower | 3 | 3 | 3 | 3 | 3 | 3 | 3 | 3 | 3 | 3 | 3 |
| Age resister 1 | 1.5 | 1.5 | 1.5 | 1.5 | 1.5 | 1.5 | 1.5 | 1.5 | 1.5 | 1.5 | 1.5 |
| Age resister 2 | | | 1.5 | 1.5 | 1.5 | 1.5 | 1.5 | 0.5 | 4.0 | 1.5 | 1.5 |
| Vulcanization Accelerator | 2 | 2 | 2 | 2 | 2 | 2 | 2 | 2 | 2 | 2 | 2 |
| Methylene donor | | 2 | 1 | 5 | 1 | 2 | 1 | 1 | 1 | 1 | 1 |
| Sulfur | 4 | 4 | 4 | 4 | 4 | 4 | 4 | 4 | 4 | 4 | 4 |
| Phenol type resin/methylene donor (mass ratio) | — | 3.5 | 3.0 | 0.6 | 3.0 | 3.5 | 3.0 | 3.0 | 3.0 | 3.0 | 3.0 |
| Proportion of quinoline type age resister (mass %) | 0 | 0 | 50 | 50 | 50 | 50 | 50 | 25 | 73 | 50 | 50 |
| M50H (MPa) | 2.8 | 6.2 | 3.3 | 6.0 | 4.5 | 5.1 | 5.2 | 4.5 | 5.0 | 4.3 | 4.5 |
| M50H/M50N | 0.9 | 1.4 | 0.9 | 1.4 | 1.1 | 1.2 | 1.2 | 1.1 | 1.2 | 1.1 | 1.1 |
| Run flat durability | 100 | 103 | 105 | 94 | 117 | 120 | 123 | 111 | 122 | 115 | 115 |

TABLE 1-continued

| Formulation (parts by mass) | Comparative Example 1 | Comparative Example 2 | Comparative Example 3 | Comparative Example 4 | Example 1 | Example 2 | Example 3 | Example 4 | Example 5 | Example 6 | Example 7 |
|---|---|---|---|---|---|---|---|---|---|---|---|
| Running performance to run over rut | A | A | A | A | A | A | A | A | A | A | A |

In Comparative Examples 1 as a control, M50H/M50N that is a ratio of tensile stress at ordinary temperature and tensile stress at high temperature was 0.9, and rigidity was decreased at high temperature. Therefore, the rubber composition of Comparative Example 1 was poor in run flat durability. In Comparative Example 2, the amount of carbon black was increased, and a phenol type resin and a methylene donor were added, as compared with Comparative Example 1. As a result, decrease of tensile stress at high temperature was not observed, but increase of rigidity was too large, and M50H/M50N exceeded 1.3. As a result, improvement effect of run flat durability was not substantially observed. In Comparative Example 3, a phenol type resin and a methylene donor were added in given amounts, but the amount of an oil was too large. As a result, rigidity at high temperature was decreased, M50H/M50N was 0.9, and improvement of run flat durability was not substantially observed. In Comparative Example 4, the amount of a methylene donor to the amount of a phenol type resin was too large, and M50H/M50N exceeded 1.3. As a result, improvement effect of run flat durability was not observed.

On the other hand, in Examples 1 to 7 in which a phenol type resin and a methylene donor were added in given amounts, and additionally two or more kinds of age resisters containing a quinoline type age resister were added, tensile stress at high temperature could be increased and M50H/M50N ratio could be set to a range of from 1.1 to 1.2. Furthermore, run flat running could be remarkably improved without deteriorating rut ride-over property that is running performance during normal running. In detail, in Example 2 in which the amounts of a phenol type resin and a methylene donor were increased as compared with Example 1, further improvement of run flat durability was observed due to high hardness. In Example 3, further improvement of run flat durability was observed as compared with Example 1 by using a polybutadiene rubber obtained by synthesizing with a neodymium type catalyst as polybutadiene rubber. In Example 4, the amount of a quinoline type age resister was decreased as compared with Example 1, and decrease of run flat durability was observed as compared with Example 1. However, run flat durability was excellent as compared with Comparative Example 1. In Example 5, the amounts of carbon black and a quinoline type age resister were increased as compared with Example 1. M50H/M50N was increased, and further improvement of run flat durability was observed. In Example 6, a small amount of an oil was added as compared with Example 1. Rigidity was decreased by the addition of an oil, but M50H/M50N was in a given range, and run flat durability was excellent.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A run flat tire having a side wall part reinforced by a side reinforcing rubber part, wherein the side reinforcing rubber part is formed from a rubber composition having a ratio (M50H/M50N) of tensile stress (M50H) in 50% elongation at a measurement temperature of 100° C. to tensile stress (M50N) in 50% elongation at a measurement temperature of 23° C. of from 1.0 to 1.3,
   wherein the rubber composition comprises a diene rubber containing natural rubber and polybutadiene rubber, a phenol type thermosetting resin and a methylene donor as its hardener, and a mass ratio of the amount of the phenol type thermosetting resin contained to the amount of the methylene donor contained is from 1.5 to 4.0,
   the amount of the phenol type thermosetting resin is from 1 to 10 parts by mass, and the amount of the methylene donor is from 0.5 to 5 parts by mass, per 100 parts by mass of the diene rubber.

2. The run flat tire according to claim 1, wherein the diene rubber comprises from 20 to 70 mass % of natural rubber and from 30 to 80 mass % of polybutadiene rubber.

3. The run flat tire according to claim 1, wherein the polybutadiene rubber is polybutadiene rubber having a cis-1,4 bond content of 96% or more and synthesized using a neodymium type catalyst.

4. The run flat tire according to claim 1, wherein the phenol type thermosetting resin is at least one selected from the group consisting of a straight phenol resin, an alkyl-substituted phenol resin, a resorcin-formaldehyde resin, a resorcin-alkyl phenol copolycondensated formaldehyde resin and their oil-modified resins, and
   the methylene donor is at least one selected from the group consisting of hexamethylenetetramine, hexamethoxymethylmelamine, hexamethylolmelamine pentamethyl ether and polyhydric methylolmelamine.

5. The run flat tire according to claim 1, wherein the rubber composition further comprises a quinoline type age resister and at least one age resister other than the quinoline type age resister.

6. The run flat tire according to claim 5, wherein the quinoline type age resister is at least one selected from the group consisting of 2,2,4-trimethyl-1,2-dihydroquinoline polymer and 6-ethoxy-2,2,4-trimethyl-1,2-dihydroquinoline, and
   at least one age resister other than the quinoline type age resister is an aromatic secondary amine type age resister.

7. The run flat tire according to claim 6, wherein the aromatic secondary amine type age resister is a p-phenylenediamine type age resister.

8. The run flat tire according to claim 5, wherein the quinoline type age resister is added in an amount of 20 mass % or more based on the total amount of the age resisters added.

9. The run flat tire according to claim 1, wherein the rubber composition does not contain an oil, or contains an oil in an amount of 5 parts by mass or less per 100 parts by mass of the diene rubber.

10. The run flat tire according to claim 1, wherein the rubber composition has the tensile stress (M50H) in 50% elongation at a measurement temperature of 100° C. of 3.5 MPa or more.

11. The run flat tire according to claim 1, wherein the diene rubber comprises from 20 to 70 mass % of natural rubber and from 30 to 80 mass % of polybutadiene rubber,
    the phenol type thermosetting resin is at least one selected from the group consisting of a straight phenol resin, an alkyl-substituted phenol resin, a resorcin-formaldehyde resin, a resorcin-alkyl phenol copolycondensated formaldehyde resin and their oil-modified resins,
    the methylene donor is at least one selected from the group consisting of hexamethylenetetramine, hexamethoxymethylmelamine, hexamethylolmelamine pentamethyl ether and polyhydric methylolmelamine,
    the rubber composition further comprises 2,2,4-trimethyl-1,2-dihydroquinoline polymer and N-phenyl-N'-(1,3-dimethylbutyl) p-phenylenediamine, and
    the rubber composition does not contain an oil, or contains an oil in an amount of 5 parts by mass or less per 100 parts by mass of the diene rubber.

* * * * *